United States Patent Office 3,520,371
Patented July 14, 1970

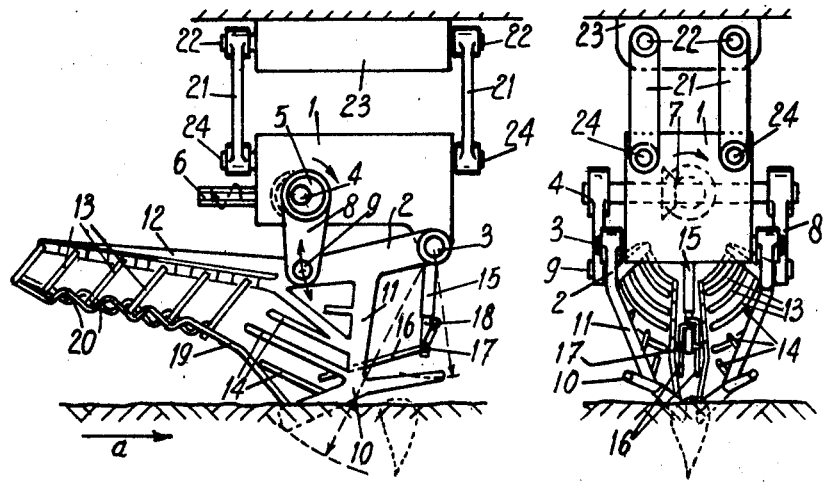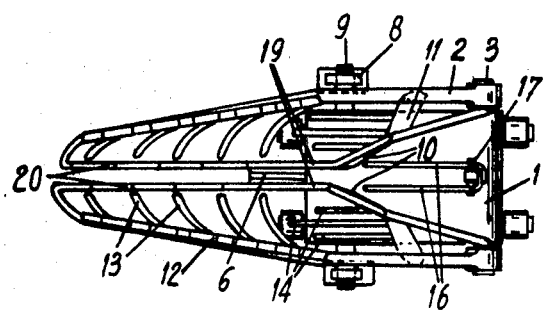

3,520,371
HARVESTING DEVICE
Herbert Vissers, Nieuw Vennep, Netherlands, assignor to Landbouwwerktuigen- en Machinefabriek H. Vissers N.V., Nieuw Vennep, Netherlands, a company of the Netherlands
Filed Sept. 25, 1967, Ser. No. 670,229
Int. Cl. A01d 25/00
U.S. Cl. 171—106                5 Claims

ABSTRACT OF THE DISCLOSURE

The digging frame of a harvester for root crop such as beets is provided with a pair of fingers which are freely pivoted ahead of the throat of the digging frame and project into the throat. The fingers act as a gate and are lifted by a root received in the throat and return under their own weight when the root clears them, to prevent the root from falling forwardly out of the throat.

---

The invention relates to a device for harvesting one or more rows of beets or the like root crops and having a travelling frame, said device being provided for each row with a harvesting lifter. With a device of this kind the drawback occurs that the beets taken up by the lifter slide forwardly from the lifter and remain on the ground at the front of the lifter.

The invention has for its object to remove said drawback of the known devices and according to the invention means are provided for preventing the beets from sliding down off the lifter. According to the invention said means consist of a valve element adapted to pivot about a transverse axis and located above the foremost part of the lifter, said means being urged upwards by the beet taken up by the lifter for allowing the beet to pass backwards on the lifter. After the beet has been passed, said valve element falls down again so that the beet is prevented from sliding down forward.

The invention will be further described with reference to the accompanying drawing, showing an embodiment of the harvesting device according to the invention.

In the drawing FIGS. 1 and 2 show a lifter according to the invention in side view and in a view from below respectively.

FIG. 3 is a front view of the lifter according to FIGS. 1 and 2.

Journals 3 project at opposite sides of the holder 1 and nearly horizontal rods 2 are pivoted on said journals. A shaft 4 is rotatably supported in the holder 1 and carries at each of its outwards projecting ends an eccentric disc 5 secured thereto. The shaft 4 is driven by a shaft 6 provided with a drive through the intermediary of a pair of bevel gear wheels 7. The rods 8 of the eccentrics 5, which may angularly be displaced through an angle of e.g. 180° relatively to each other are pivoted to a transverse stud 9 of each rod 2. The lifter is fork-shaped and the legs 10 of the fork each are connected to the corresponding rod 2 by an upright rod 11.

The rods 2 each are extended to the rear by a part 12 and said rod parts converge to the rear. A number of bars 13 project downwards at each of the rods 12, said bars forming grids and the corresponding bars of both grids converge downwards as appears from FIG. 3. Guide bars 14 are provided at the upright rod 11 and at the rearmost end of the legs 10 of the fork, and said bars 14 being directed rearwards and guide the beet lifted by the legs 10 towards the pair of cleaning grids.

At the holder 1 below the foremost part thereof a rod 15 is secured and to said rod a valve element 16 is pivoted at 17, said valve element having an abutment 18 at the rod 15, defining the lowermost position of the valve element. Said valve element may consist of a metal strip or of an U-shaped bar or preferably of two L-shaped bars as shown in the drawing. Each of said L-shaped bars is adapted to pivot about a horizontal journal 17 provided at the rod 15.

One or more bars 19 are secured to the rear end of each of the legs 10 of the fork, said bar being upwards inclined to the rear and provided with steplike recesses 20. The foremost part of the rods 19 preferably is steeper upwards inclined from the legs 10 of the fork than the rearmost part of the rods containing the steplike recesses 20. On said steep foremost part of the rods 19 the loose earth taken up together with the beets is separated from the beets and falls back on the ground below the rods 19 and beets move further on the rods 19.

If the device travels on the ground in the direction of the arrow a and the legs 10 of the fork are driven by the eccentrics 5 both legs 10 and therefore also both grids 13 and the rods 19 provided with the recesses 20 move relatively to each other. Thereby the beets are lifted out of the ground and moved to the rear on the legs 10 of the fork and on the rods 19 and after the best has passed the valve element 16 said latter falls down again, so that the beet is prevented from sliding forwards off the legs 10 of the fork. Also on the rods 19 said forwards sliding of the beets is prevented by the recessed 20 in said rods.

For vertical adjustment of the valve element 16 the holder rod 15 may have a variable length.

In FIG. 1 both eccentrics 5 are shown in their centre position. It is not required that the left and the right rod 19 are then the mirror image of each other and as shown in FIG. 1 the recesses 20 of the one rod may be displaced in longitudinal direction with respect to the other rod whereby the lifting action of said rods is still improved.

The holder 1 of the lifter 10 is suspended by means of two pairs of parallel levers 21 from journals 22 at a part 23 of the traveling frame, not shown in the drawing and provided with ground wheels. The levers 21 are hinged on journals 24 of the holder 1 and said journals constitute a pivot axis extending in longitudinal direction, so that the holder may freely move in transverse direction and the lifter 10 is adapted to obtain its correct position above the beet to be elevated.

The valve element 16 may also be used in combination with a rotating lifter.

What I claim is:
1. In a harvesting machine for beets or like root crops in which the machine is of the type having a digging frame providing a throat adapted to penetrate the soil to undermine and lift roots thereinto the improvement which comprises:
    finger means freely pivoted ahead of said throat and trailing from the pivotal connection to project into said throat so as to be lifted by the root received in said throat, and
    abutment means for allowing said finger means normally to swing downwardly within said throat to prevent roots from falling from the throat.
2. In the harvesting machine according to claim 1 wherein said finger means comprises a pair of generally parallel rods.
3. In a harvesting machine for beets or like root crops in which the machine is of the type including a support adapted to be moved along above a crop row, digging means carried by said support and having a throat for penetrating the soil and lifting the roots upwardly therefrom, and means for receiving the roots after having been so lifted and delivering them to some point remote from the digging site, the improvement comprising:

finger means pivotally mounted on said support ahead of said throat and including trailing portions projecting into said throat so as to be displaced upwardly as a root is lifted within the throat, and abutment means for allowing said trailing portions normally to swing downwardly within said throat to prevent roots from falling forwardly out of said throat.

4. In a harvesting machine according to claim 3 wherein said trailing portions are of elongate rod form.

5. In a harvesting machine according to claim 3 wherein said digging means comprises a pair of side-by-side frames, each pivoted at its forward end to said support, means for oppositely oscillating said frames, and said finger means being pivotally mounted below the axis of pivotal connection between said support and said frames.

References Cited

UNITED STATES PATENTS

| | | | |
|---|---|---|---|
| 206,568 | 7/1878 | Higgins | 171—106 |
| 1,158,956 | 11/1915 | Bartholomew | 171—104 |

ANTONIO F. GUIDA, Primary Examiner